(12) United States Patent
Fukuda et al.

(10) Patent No.: US 8,119,760 B2
(45) Date of Patent: Feb. 21, 2012

(54) CURABLE PERFLUOROPOLYETHER COMPOSITIONS AND RUBBER OR GEL ARTICLES COMPRISING THE SAME

(75) Inventors: Kenichi Fukuda, Gunma-ken (JP); Mikio Shiono, Gunma-ken (JP); Hirofumi Kishita, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 259 days.

(21) Appl. No.: 12/468,721

(22) Filed: May 19, 2009

(65) Prior Publication Data

US 2009/0292096 A1 Nov. 26, 2009

Related U.S. Application Data

(62) Division of application No. 11/148,360, filed on Jun. 9, 2005, now abandoned.

(30) Foreign Application Priority Data

Jun. 11, 2004 (JP) ................................ 2004-174777

(51) Int. Cl.
*C08G 77/24* (2006.01)
(52) U.S. Cl. ................. 528/42; 528/36; 528/31; 528/32
(58) Field of Classification Search .................... 528/42, 528/36, 31, 32
See application file for complete search history.

(56) References Cited

U.S. PATENT DOCUMENTS

| | | | |
|---|---|---|---|
| 6,552,152 B2 | 4/2003 | Sakano et al. | |
| 6,759,468 B2 | 7/2004 | Sato et al. | |
| 2002/0095009 A1 | 7/2002 | Sato et al. | |
| 2004/0014889 A1 | 1/2004 | Fukuda et al. | |

FOREIGN PATENT DOCUMENTS

| | | |
|---|---|---|
| EP | 1033387 A2 | 9/2000 |
| EP | 1217025 A1 | 6/2002 |
| EP | 1288243 A1 | 3/2003 |
| EP | 1321480 A2 | 6/2003 |
| JP | 2990646 B2 | 10/1999 |
| JP | 2000-248166 A | 9/2000 |
| JP | 2002-12769 A | 1/2002 |
| JP | 2002-167502 | 6/2002 |
| JP | 2002-188003 | 7/2002 |
| JP | 2003-198084 A | 7/2003 |

OTHER PUBLICATIONS

Japanese Office Action issued Jan. 20, 2010, in corresponding Japanese Application No. 2005-167709.

*Primary Examiner* — Kuo-Liang Peng
(74) *Attorney, Agent, or Firm* — Birch, Stewart, Kolasch & Birch, LLP

(57) ABSTRACT

Perfluoropolyether compositions are provided comprising: (A) a linear perfluoropolyether compound containing at least two alkenyl groups, having a perfluoropolyether structure comprising recurring units —$C_aF_{2a}O$— in its backbone, and having a molecular weight of 10,000 to 100,000; (B) an organosilicon compound containing at least two silicon atom-bonded hydrogen atoms; (C) a reinforcing filler; (D) a hydrosilylation catalyst; and (E) a polyfluoromonoalkenyl compound containing one alkenyl group and having a perfluoropolyether structure in its backbone. The compositions cure into rubber or gel products having improved acid resistance.

6 Claims, 1 Drawing Sheet

CURABLE PERFLUOROPOLYETHER COMPOSITIONS AND RUBBER OR GEL ARTICLES COMPRISING THE SAME

CROSS-REFERENCE TO RELATED APPLICATION

This is a divisional of application Ser. No. 11/148,360, filed Jun. 9, 2005, now abandoned, priority to which is claimed under 35 U.S.C. §120. Application Ser. No. 11/148,360 claims priority under 35 U.S.C. §119(a) to Patent Application No. 2004-174777 filed in Japan on Jun. 11, 2004. The entire contents of both are hereby incorporated by reference.

FIELD OF THE INVENTION

This invention relates to perfluoropolyether compositions which cure into rubber or gel products having heat resistance, oil resistance, chemical resistance, solvent resistance, low-temperature properties, moisture resistance, and low gas permeability and especially, improved acid resistance. The invention also relates to rubber or gel articles obtained by curing the compositions.

BACKGROUND ART

Japanese Patent No. 2,990,646 (JP-A 8-199070) discloses a curable composition comprising a linear perfluoropolyether compound containing at least two alkenyl groups per molecule and having a perfluoropolyether structure in its backbone, an organosilicon compound having at least two H—SiOSiO structures per molecule, and a hydrosilylation catalyst, which cures into a product having a good profile of heat resistance, chemical resistance, solvent resistance, water repellency, oil repellency and weatherability.

These perfluoropolyether rubber compositions perform well in most applications. However, their acid resistance is short in those applications requiring chemical resistance such as sealants in semiconductor manufacturing units, sealants and potting materials for use with engine oil, and sealants and potting materials for use in engine exhaust parts. There is a need for perfluoropolyether rubber or gel compositions which are improved in oil resistance and chemical resistance, and especially acid resistance.

JP-A 2000-248166 discloses a curable fluoropolyether base rubber composition comprising a linear fluoropolyether compound having at least two alkenyl groups, an organosilicon compound having at least two SiH groups, a hydrosilylation catalyst, and surface-hydrophobicized microparticulate silica having a specific surface area of at least 50 m²/g and a nitrogen atom content of 500-5,000 ppm.

SUMMARY OF THE INVENTION

An object of the invention is to provide curable perfluoropolyether compositions which are cured into rubber or gel having exhibit good heat resistance, solvent resistance, chemical resistance, weatherability, water repellency and oil repellency and especially acid resistance. Another object is to provide rubber or gel articles comprising the same.

It has been found that perfluoropolyether compositions which cure into rubber or gel products having improved acid resistance are obtainable using a linear perfluoropolyether compound having a weight average molecular weight of 10,000 to 100,000.

In one aspect, the present invention provides a curable perfluoropolyether composition comprising (A) a linear perfluoropolyether compound containing at least two alkenyl groups per molecule, having a perfluoropolyether structure comprising recurring units —$C_aF_{2a}O$— wherein a is an integer of 1 to 6 in its backbone, and having a weight average molecular weight of 10,000 to 100,000; (B) an organosilicon compound containing at least two silicon atom-bonded hydrogen atoms per molecule, selected from the class consisting of (B-1) a cyclic organohydrogenpolysiloxane containing at least one perfluoroalkyl group or perfluoropolyether substituent group per molecule, and (B-2) an organosilicon compound containing at least one perfluoroalkyl group or perfluoropolyether substituent group per molecule wherein all silicon atom-bonded hydrogen atoms form H—Si(CH$_2$)$_g$Si— structures wherein g is an integer of 1 to 3; (C) a reinforcing filler; and (D) a hydrosilylation catalyst, the composition being cured into a rubber.

In another aspect, the present invention provides a curable perfluoropolyether composition comprising (A) a linear perfluoropolyether compound as defined above; (B) an organosilicon compound as defined above; (D) a hydrosilylation catalyst; and (E) a polyfluoromonoalkenyl compound containing one alkenyl group per molecule and having a perfluoropolyether structure in its backbone, the composition being cured into a gel.

In this specification, a rubber-like cured product or rubber means a cured product which is able to measure hardness according to JIS K 6253 or ISO 1619 and especially has a hardness of 10 to 80 according to JIS A-type hardness tester or Type A Durometer. On the other hand, gel-like cured product or gel means that a cured product which is unable to measure hardness according to JIS A-type hardness tester or Type A Durometer and has a penetration of 1 to 200, especially 10 to 150 according to JIS K 2220 or ASTM D-1403.

The perfluoropolyether compositions of the invention, when cured, impart rubber or gel products having good heat resistance, oil resistance, chemical resistance, solvent resistance, low-temperature properties, moisture resistance and low gas permeability, and especially improved acid resistance.

DESCRIPTION OF THE PREFERRED EMBODIMENT

Figure 1:
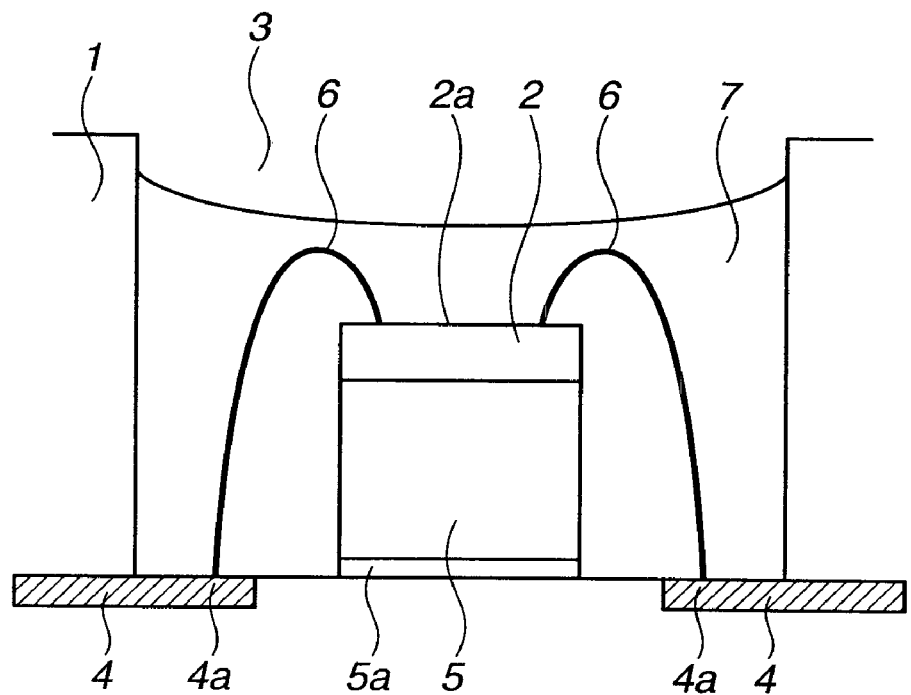
FIGS. 1 and 2 are transverse cross-sectional views of electronic packages under test in Example 5.

Component (A) of the curable perfluoropolyether compositions according to the invention is a linear perfluoropolyether compound containing at least two alkenyl groups per molecule, having a perfluoropolyether structure, preferably divalent perfluoroalkylether structure, in its backbone, and having a weight average molecular weight (Mw) of 10,000 to 100,000, as determined by gel permeation chromatography (GPC) relative to polystyrene standards.

The perfluoroalkyl ether structures include structures comprising a plurality of recurring units —$C_aF_{2a}O$— wherein a is at each occurrence an integer of 1 to 6, for example, structures represented by the general formula (7):

$$(C_aF_{2a}O)_q \qquad (7)$$

wherein q is an integer of 50 to 600, preferably 50 to 400, more preferably 50 to 200.

Examples of the recurring units —$C_aF_{2a}O$— are: —$CF_2O$—, —$CF_2CF_2O$—, —$CF_2CF_2CF_2O$—, —CF($CF_3$)$CF_2O$—, —$CF_2CF_2CF_2CF_2O$—, —$CF_2CF_2CF_2CF_2CF_2CF_2O$—, and —C($CF_3$)$_2O$—. Of these, —$CF_2O$—, —$CF_2CF_2O$—, —$CF_2CF_2CF_2O$— and CF($CF_3$)$CF_2O$— are preferred. It is understood that the perfluoroalkyl ether structure may consist of recurring units —$C_aF_{2a}O$— of one type or recurring units of two or more types.

The alkenyl groups in the linear perfluoropolyether compound (A) are preferably those groups having 2 to 8 carbon atoms, especially 2 to 6 carbon atoms, and terminated with a $CH_2$=CH— structure, for example, vinyl, allyl, propenyl, isopropenyl, butenyl, and hexenyl. Of these, vinyl and allyl are preferred. The alkenyl groups may be attached to the backbone at both ends either directly or through divalent linkages such as —$CH_2$—, —$CH_2O$— or —Y—NR—CO—. Herein Y is —$CH_2$— or a dimethylphenylsilylene group of the formula (Z):

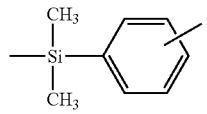
(Z)

(inclusive of o-, m- and p-positions), and R is hydrogen, methyl, phenyl or allyl. There should be included at least two alkenyl groups per molecule.

Suitable perfluoropolyether compounds (A) include polyfluorodialkenyl compounds of the general formulae (8) and (9).

$$CH_2=CH—(X)_p—Rf^1—(X')_p—CH=CH_2 \quad (8)$$

$$CH_2=CH—(X)_p\text{-Q-}Rf^1\text{-Q-}(X'')_p—CH=CH_2 \quad (9)$$

In formulae (8) and (9), X is independently —$CH_2$—, —$CH_2O$—, —$CH_2OCH_2$— or —Y—$NR^1$—CO— wherein Y is —$CH_2$— or a dimethylphenylsilylene group of the structural formula (Z) and $R^1$ is hydrogen, methyl, phenyl or allyl. X' is —$CH_2$—, —$OCH_2$—, —$CH_2OCH_2$— or —CO—$NR^2$—Y'— wherein Y' is —$CH_2$— or a dimethylphenylsilylene group of the structural formula (Z') and $R^2$ is hydrogen, methyl, phenyl or allyl. $Rf^1$ is a divalent perfluoropolyether structure, and preferably one of above formula (7); that is, of the formula $(C_aF_{2a}O)_q$. Q is a divalent hydrocarbon group having 1 to 15 carbon atoms which may contain an ether bond, for example, an alkylene group or an alkylene group containing an ether bond. The letter p is independently 0 or 1. (inclusive of o-, m- and p-positions)

(Z')

(inclusive of o-, m- and p-positions)

The linear perfluoropolyether compound serving as component (A) is most preferably a compound of the general formula (1).

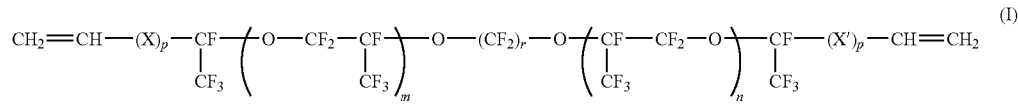
(I)

Herein, X, X' and p are as defined above, r is an integer of 2 to 6, each of m and n is an integer of 0 to 600, and the sum of m+n is 50 to 600.

The linear perfluoropolyether compound of formula (1) should desirably have a weight-average molecular weight (Mw) of 10,000 to 100,000, and most preferably 10,000 to 50,000. Compounds with Mw of less than 10,000 undergo substantial swell in gasoline and other solvents, as demonstrated by a swell factor of at least 6% in gasoline, failing to meet the requirements of parts that must be gasoline resistant. Compounds with Mw of more than 100,000 are too viscous to work, detracting from practical utility.

Illustrative examples of the linear perfluoropolyether compound of formula (1) are given below.

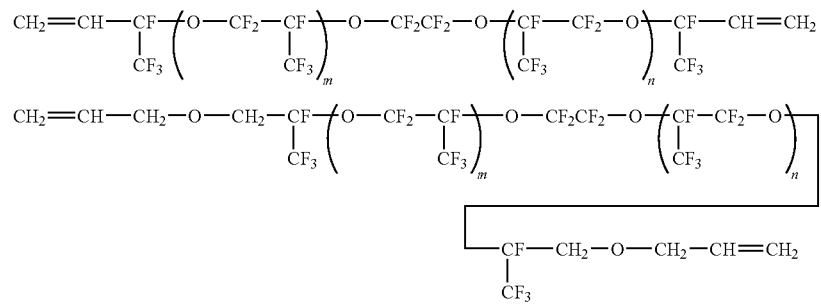

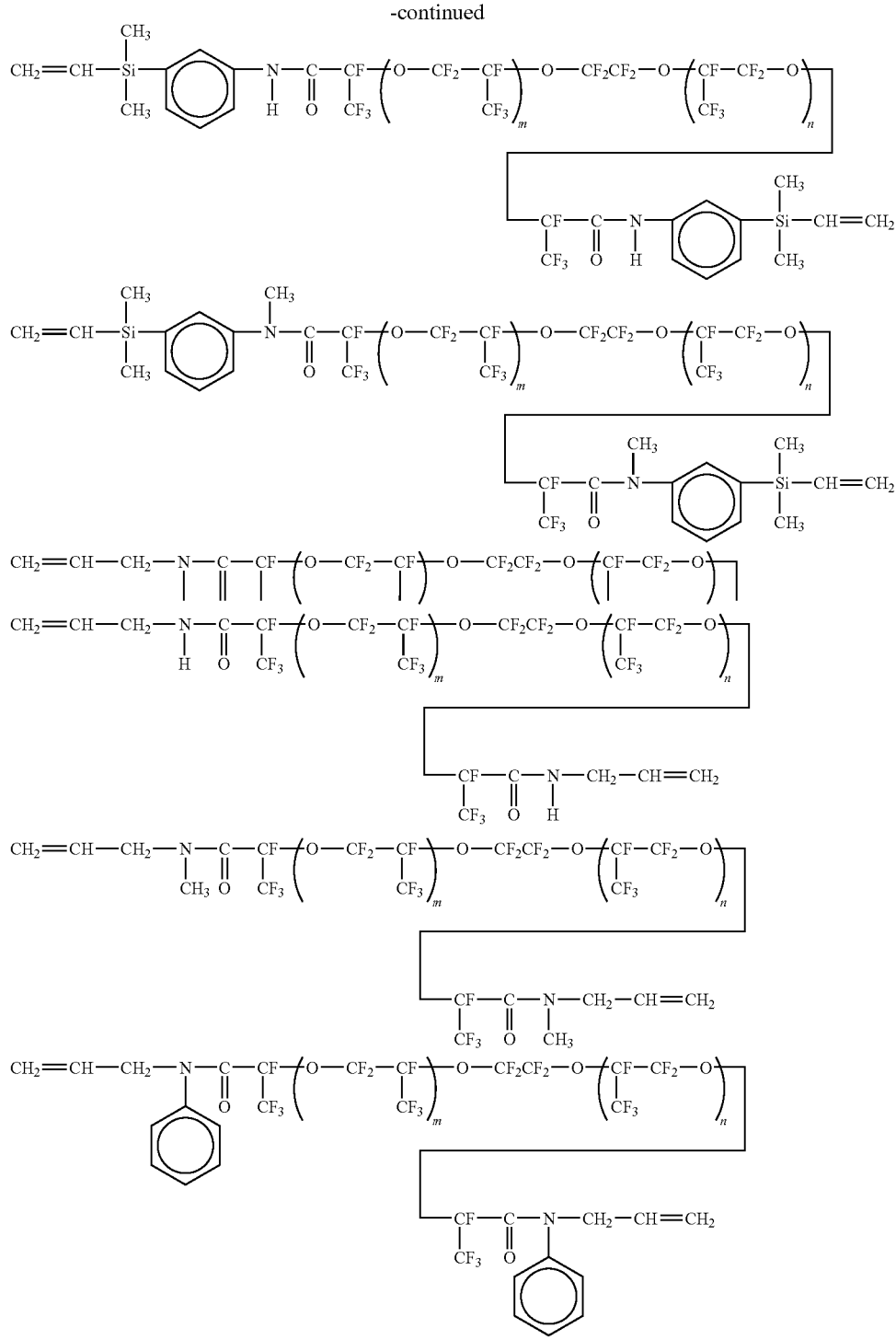

Note that each of m and n is an integer of 0 to 200, and the sum of m+n is 50 to 200.

In the practice of the invention, to modify the linear perfluoropolyether compound of formula (1) to the desired weight-average molecular weight in accordance with the intended use, the linear perfluoropolyether compound may be previously subjected to hydrosilylation with an organosilicon compound bearing two SiH groups in a molecule by means of an ordinary method and under ordinary conditions. The resulting chain-extended product can be used as component (A).

Component (B) is an organosilicon compound having at least two silicon atom-bonded hydrogen atoms (i.e., SiH groups) in a molecule. The organosilicon compound (B) serves as a crosslinking agent and chain extender for component (A). When compatibility with and dispersion in component (A) and components (E) and (F) to be described later and uniformity after curing are taken into account, the organosilicon compound should preferably have at least one monovalent perfluoroalkyl, monovalent perfluorooxyalkyl, divalent perfluoroalkylene or divalent perfluorooxyalkylene group in a molecule.

Preferred component (B) is (B-1) a cyclic organohydrogenpolysiloxane containing at least one perfluoroalkyl group or perfluoropolyether substituent group per molecule. Of these organohydrogenpolysiloxane compounds (B-1), those of the general formula (5) are preferred.

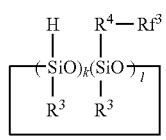
(5)

Herein $Rf^3$ is a monovalent perfluoroalkyl or perfluoropolyether group, $R^3$ is a monovalent hydrocarbon group of 1 to 20 carbon atoms, $R^4$ is a divalent hydrocarbon group of 2 to 20 carbon atoms which may contain an ether bond, k is an integer of at least 2, l is an integer of 1 to 6, and the sum of k+l is 3 to 10.

Examples of monovalent perfluoroalkyl or perfluoropolyether groups represented by $Rf^3$ include monovalent perfluoroalkyl groups:

$C_bF_{2b+1}-$ wherein b is an integer from 1 to 20, and preferably from 2 to 10 and
monovalent perfluorooxyalkyl groups:

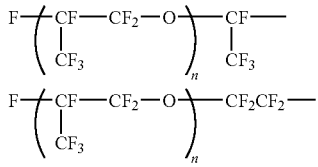

wherein n is an integer from 2 to 200, preferably 2 to 100.

$R^3$ is a monovalent hydrocarbon group of 1 to 20 carbon atoms, for example, alkyl groups such as methyl, ethyl, propyl, isopropyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl and hexenyl; aryl groups such as phenyl, tolyl, xylyl and naphthyl; and aralkyl groups such as benzyl, phenylethyl, phenylpropyl. Of these, those free of aliphatic unsaturation are preferred.

$R^4$ is a divalent hydrocarbon group of 2 to 20 carbon atoms which may contain an ether bond. Such divalent linking groups include alkylene groups, arylene groups, and combinations thereof, in which may intervene an ether-bonding oxygen atom, an amide bond, a carbonyl bond or the like, with those of 2 to 12 carbon atoms being preferred. Examples of suitable divalent linking groups are:

—CH$_2$CH$_2$—,
—CH$_2$CH$_2$CH$_2$—,
—CH$_2$CH$_2$CH$_2$OCH$_2$—,
—CH$_2$CH$_2$CH$_2$—NH—CO—,
—CH$_2$CH$_2$CH$_2$—N(Ph)—CO—,
—CH$_2$CH$_2$CH$_2$—N(CH$_3$)—CO—, and
—CH$_2$CH$_2$CH$_2$—O—CO—.

Note that Ph is phenyl.

Examples of suitable compounds having at least one perfluoroalkyl group or perfluoropolyether substituent group in a molecule as component (B-1) are given below. They may be used alone or in admixture of two or more, or in admixture with component (B-2) to be described later. Note that Me is methyl and Ph is phenyl.

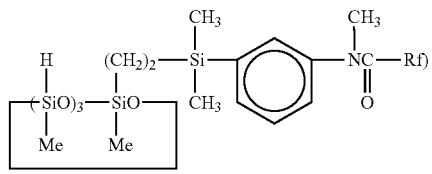

$\bar{n} = 24$

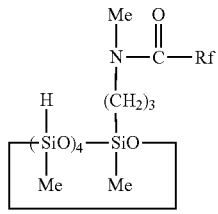

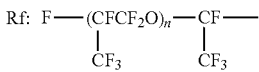

$n = \overline{50}$

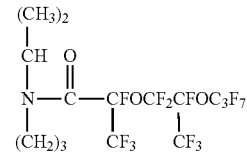

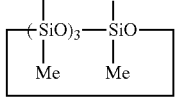

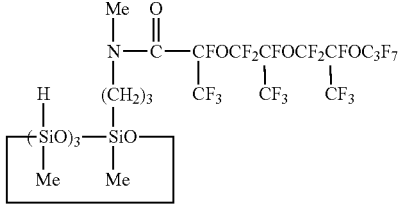

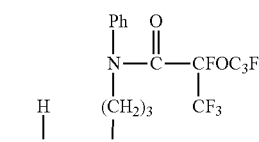

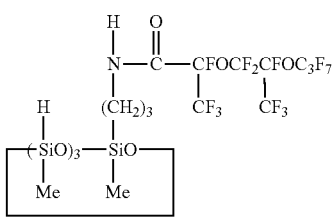

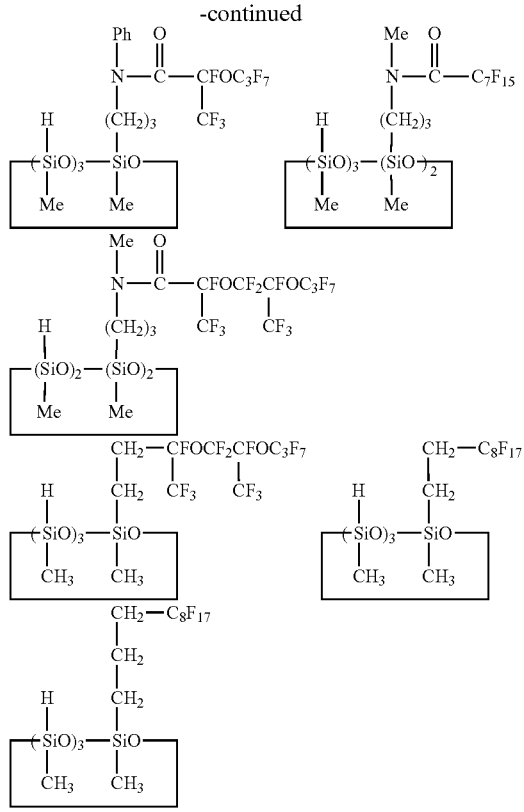

Component (B) also includes (B-2) an organosilicon compound containing at least one perfluoroalkyl group or perfluoropolyether substituent group per molecule wherein all silicon atom-bonded hydrogen atoms form H—Si(CH$_2$)$_g$Si— structures wherein g is 1 to 3.

Of such component (B-2), organosilicon compounds of the general formula (6) are preferred.

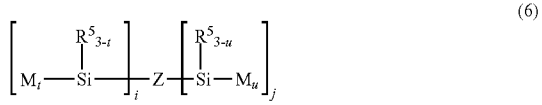

Herein i and j are 0 or 1, and not both i and j are 0; $R^5$ is a monovalent hydrocarbon group of 1 to 20 carbon atoms; t is 1, 2 or 3, and u is 0, 1, 2 or 3.

In the case where either one of i and j is 0 and the other is 1, Z is hydrogen, -Q-M or -Q-Rf$^3$, Q is a divalent hydrocarbon group of 1 to 15 carbon atoms, such as an alkylene, an arylene, and a group in which an alkylene group and an arylene group are combined, which may contain an ether bond, Rf$^3$ is a monovalent perfluoroalkyl or perfluorooxyalkyl group as defined above, and M is a group of formula (i):

wherein $R^6$ is a monovalent hydrocarbon group of 1 to 20 carbon atoms, and g is an integer of 1 to 3.

In the case where both i and j are 1, Z is -Q-, —Rf'— or -Q-Rf'-Q-, Q is as defined above, Rf' is a divalent perfluoroalkylene or perfluorooxyalkylene group, M is a group of the formula (ii) and/or a group of the formula (iii):

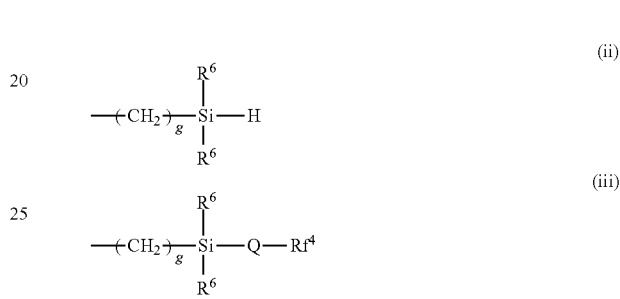

wherein Rf$^4$ is monovalent perfluoroalkyl or perfluoropolyether group as in Rf$^3$ and g is 1 to 3, with the proviso that there are present at least two groups of formula (ii) per molecule.

Examples of the divalent perfluoroalkylene or perfluorooxyalkylene group represented by Rf' include divalent perfluoroalkylene groups of the formula:

—C$_c$F$_{2c}$— wherein c is an integer from 1 to 20, and preferably from 2 to 10, and divalent perfluorooxyalkylene groups of the formulae:

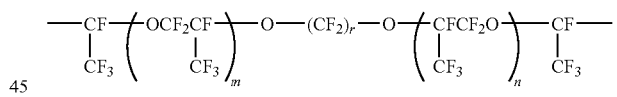

wherein m+n is an integer of 1 to 200 and r is an integer of 2 to 6 and

wherein each of m and n is an integer from 1 to 50.

Examples of suitable compounds having fluorinated groups (B-2) include the following compounds. They may be used alone or in admixture of two or more, or in admixture with component (B-1) described above. Note that Me is methyl and Ph is phenyl.

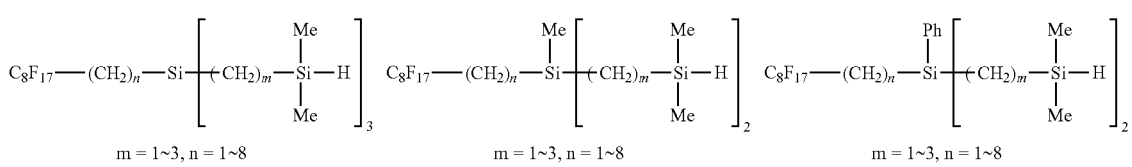

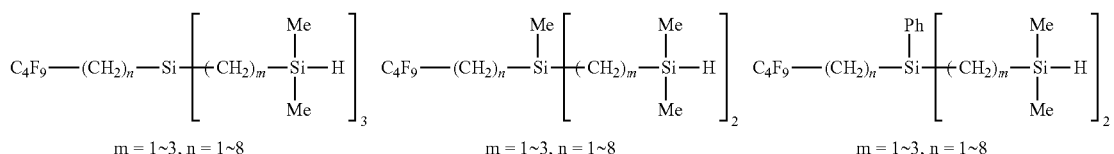
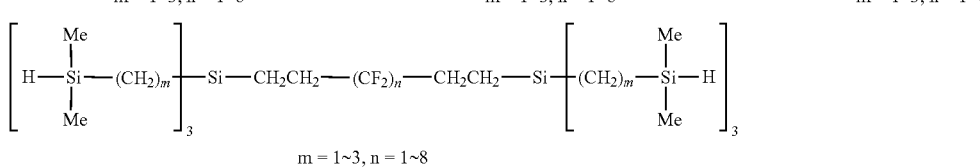
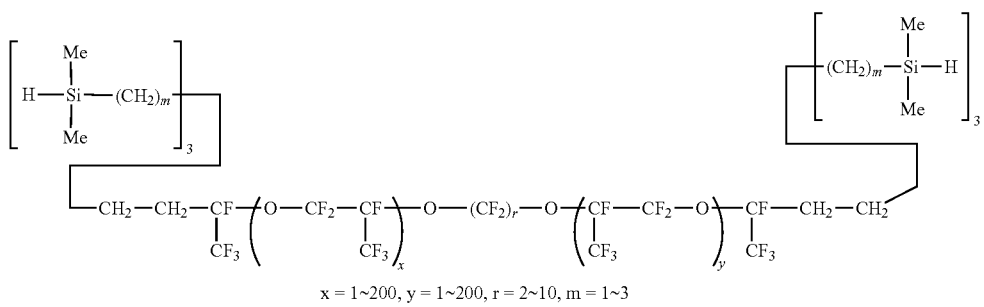
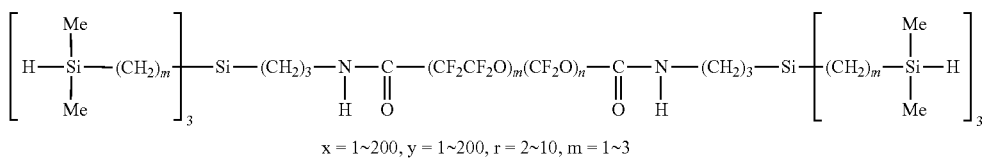
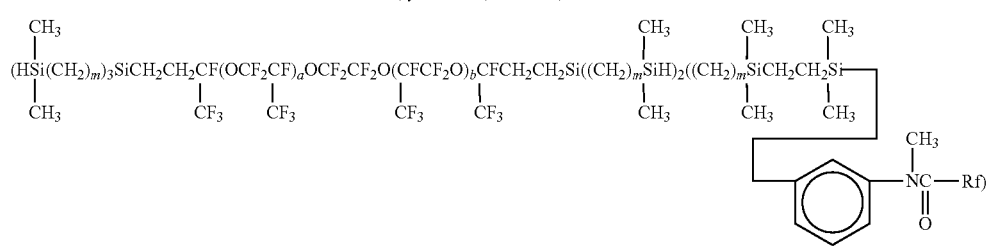
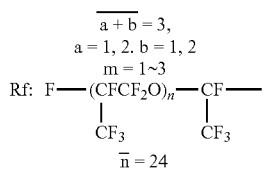
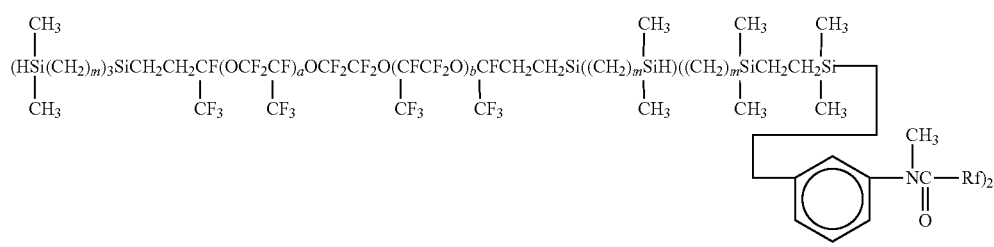
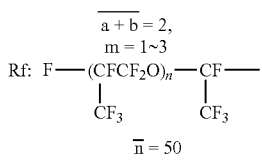

-continued

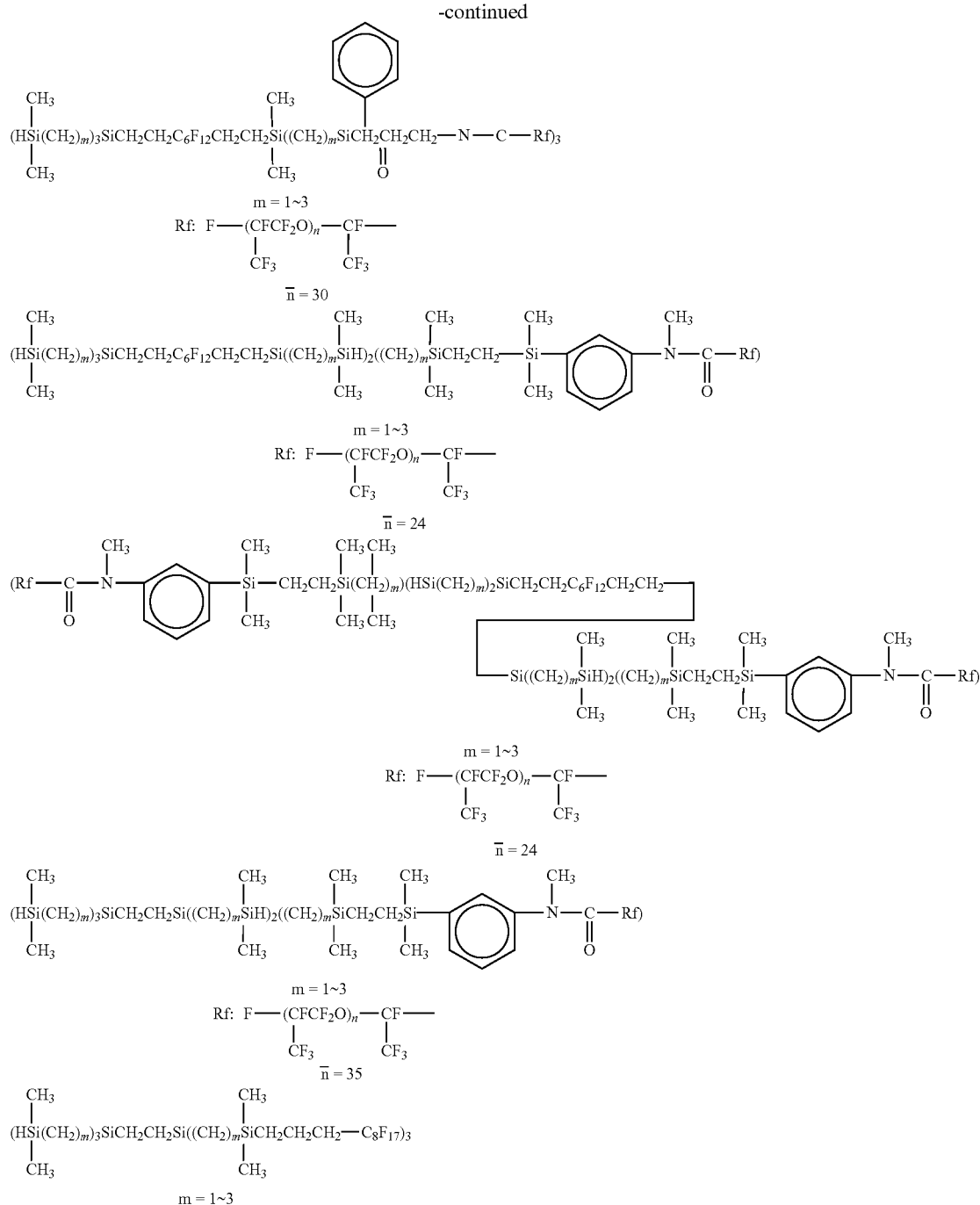

Component (B) is generally included in an amount effective for curing components (A) and (E), specifically an amount of supplying preferably 0.2 to 2 moles, and more preferably 0.5 to 1.3 moles, of hydrosilyl (SiH) groups per mole of total alkenyl groups on components (A) and (E). Too little hydrosilyl (SiH) groups may lead to an inadequate degree of crosslinking or under-cure, whereas too much may cause foaming during curing.

Component (C) is a reinforcing filler. It is added to the curable perfluoropolyether rubber composition for the purposes of improving mechanical strength, thermal stability, weatherability, chemical resistance or flame retardance, reducing heat shrinkage upon curing, or reducing a coefficient of thermal expansion or a gas permeability of an elastomer resulting from curing. The major purpose is to improve mechanical strength.

Examples of the reinforcing filler (C) include fumed silica, wet silica, ground silica, calcium carbonate, diatomaceous earth, carbon black, and various powdered metal oxides excluding alumina. They may have been treated with surface treating agents. From the mechanical strength standpoint, fumed silica is preferred; and from the dispersion standpoint, fumed silica treated with silane surface treating agents is most preferred.

Hydrophobic treating agents for dry silica, also known as fumed silica, include silicon compounds having hydrolyzable groups, for example, organochlorosilanes such as dimethyldichlorosilane and trimethylchlorosilane, silazane compounds such as hexamethyldisilazane, and cyclic silazane compounds such as hexamethylcyclotrisilazane. Inter alia, dry silica surface treated with organochlorosilane is preferred for mechanical strength.

Silica treated to be hydrophobic should preferably have a specific surface area of at least 50 m$^2$/g in order to improve mechanical properties. The specific surface area should be up to 300 m$^2$/g because otherwise silica-compounded compositions have too much a viscosity buildup.

For the silica fine powder which has been surface treated with surface treating agents for hydrophobization, direct treatment in the particulate state is preferred. Any commonly known techniques may be employed for the surface treatment. For example, untreated silica powder is fed along with a treating agent to a closed mechanical mixing unit or a fluidized bed under atmospheric pressure where they are admixed together for treatment at room temperature or elevated temperature, optionally in the presence of an inert gas. In some cases, a catalyst and water for promoting hydrolysis may be used. Kneading is followed by drying, leaving the treated silica fine powder. The amount of the treating agent used may be at least the amount computed from the coverage area for the treating agent.

Furthermore, the silica filler should preferably have a bulk density of 30 to 80 g/l. A silica filler with a bulk density of less than 30 g/l may provide a composition with a viscosity buildup to interfere with compounding. A silica filler with a bulk density of more than 80 g/l may fail to achieve a sufficient reinforcement effect.

The reinforcing filler is preferably added in an amount of 1 to 200 parts by weight per 100 parts by weight of component (A). An amount of 1 to 60 parts by weight is more preferred for consistent mechanical properties. Less than 1 pbw of the filler is too small to be uniformly dispersed in the composition whereas more than 200 pbw is difficult to compound because of a noticeable viscosity buildup.

It is possible to use component (C) in curable perfluoropolyether gel compositions as an additive for the purposes of providing reinforcement and thixotropy thereto. An appropriate amount of component (C) added to curable perfluoropolyether gel compositions is preferably 0 to 20 parts by weight per 100 parts by weight of components (A), (B) and (E) combined. The preferred amount is 0 to 10 parts by weight when properties of gel cured products are considered. More than 20 parts by weight of the filler fails to provide elastic properties as gel.

Component (D) is a hydrosilylation catalyst which promotes addition reaction between alkenyl groups in components (A) and (E) and hydrosilyl groups in component (B). The hydrosilylation catalysts are typically noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and metallic platinum supported on silica, alumina or carbon though not limited thereto. Known platinum group metal compounds other than the platinum compounds include rhodium, ruthenium, iridium, and palladium compounds, for example, RhCl(PPh$_3$)$_3$, RhCl(CO)(PPh$_3$)$_2$, Ru$_3$(CO)$_{12}$, IrCl(CO)(PPh$_3$)$_2$, and Pd(PPh$_3$)$_4$ wherein Ph denotes phenyl.

The amount of the hydrosilylation catalyst used may be a catalytic amount, and preferably an amount to give 0.1 to 100 ppm of platinum group metal based on the total weight of components (A), (B), (C) and (E).

Component (E) is a polyfluoromonoalkenyl compound containing one alkenyl group per molecule and having a perfluoropolyether structure in its backbone. It is preferably a polyfluoromonoalkenyl compound having the general formula (2):

wherein X' and p are as defined above, Rf$^2$ is a group of the general formula:

wherein w is an integer of 1 to 500.

Illustrative examples of the polyfluoromonoalkenyl compound having formula (2) are given below.

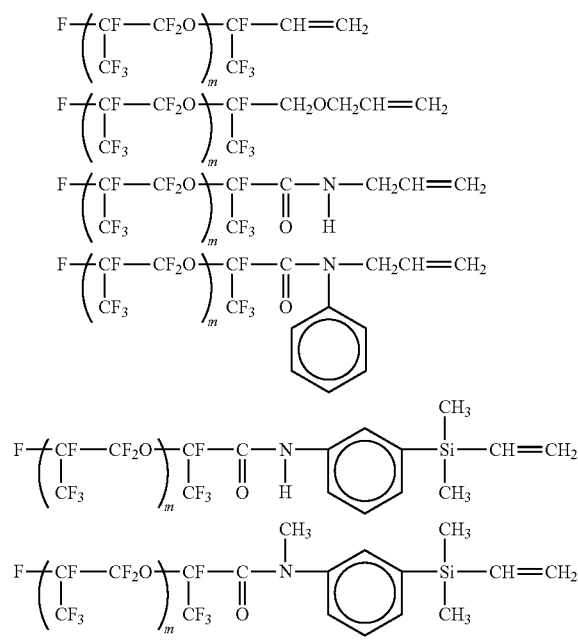

Herein m is an integer of 1 to 500.

In the curable perfluoropolyether gel composition, an appropriate amount of the polyfluoromonoalkenyl compound having formula (2) compounded is 1 to 300 parts, preferably 50 to 250 parts by weight per 100 parts by weight of component (A) or linear perfluoropolyether dialkenyl compound.

Regardless of whether it is a rubber or gel composition, the perfluoropolyether composition of the invention may further comprise (F) a nonfunctional fluoropolymer having a perfluoropolyether structure comprising recurring units —C$_a$F$_{2a}$O— wherein a is as defined above, but free of alkenyl groups. This nonfunctional fluoropolymer is most preferably linear.

The linear perfluoropolyether compound, when compounded as component (F), serves to improve chemical resistance, solvent resistance and low-temperature properties without detracting from physical properties. Particularly when it is compounded in perfluoropolyether rubber and gel compositions, it is effective for imparting improved low-temperature properties, typically lowering the glass transition temperature.

Component (F) is preferably at least one linear perfluoropolyether compound selected from the class consisting of compounds having the general formula (3):

$$A-O-(CF_2CF_2CF_2O)_d-A \quad (3)$$

wherein A is a group of $C_eF_{2e+1}$— wherein e is 1 to 3, and d is an integer of 1 to 500, and compounds having the general formula (4):

$$A-O-(CF_2O)_f(CF_2CF_2O)_h-A \quad (4)$$

wherein A is as defined above, and f and h each are an integer of 1 to 300.

Illustrative examples of component (F) are:
$CF_3O-(CF_2CF_2CF_2O)_n-CF_2CF_3$ and
$CF_3-[(OCF_2CF_2)_n(OCF_2)_m]-O-CF_3$
wherein m is an integer of 1 to 200, n is an integer of 1 to 200, and m+n is 1 to 200.

An appropriate amount of component (F) compounded varies whether the perfluoropolyether composition is a rubber or gel composition. In the perfluoropolyether gel composition, the preferred amount of component (F) is 20 to 100 parts by weight per 100 parts by weight of components (A) and (E) combined, i.e., polyfluorodialkenyl compound plus polyfluoromonoalkenyl compound. In the perfluoropolyether rubber composition, the preferred amount of component (F) is 10 to 50 parts by weight per 100 parts by weight of component (A). Component (F) may be one or more of suitable compounds.

In addition to components (A) to (F) described above, the compositions of the invention may further comprise various additives. Suitable hydrosilylation catalyst regulators include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; 3-methyl-3-penten-1-yne and 3,5-dimethyl-3-hexen-1-yne; polymethylvinylsiloxane cyclic compounds; and organophosphorus compounds. The addition of such regulators keeps appropriate cure reactivity and shelf stability.

Suitable inorganic fillers include iron oxide, zinc oxide, titanium oxide, calcium carbonate, magnesium carbonate, zinc carbonate, and carbon black. The addition of such inorganic fillers adjusts the hardness or mechanical strength of cured products of the compositions. Hollow inorganic fillers or spherical rubbery fillers are also useful.

To impart adhesion, any of well-known tackifiers having epoxy, alkoxy or similar groups may be added. Such tackifiers may be used in any desired amounts as long as they do not interfere with properties of the compositions or properties of the cured products.

The perfluoropolyether rubber or gel compositions of the invention cure into satisfactory products having good heat resistance, chemical resistance, solvent resistance, water repellency, oil repellency and weatherability and especially improved acid resistance and thus finding a variety of applications.

The cured perfluoropolyether rubber can be formed by combining 100 parts by weight of component (A) with an amount of component (B) to provide 0.2 to 2.0 moles of hydrosilyl groups per mole of total alkenyl groups in component (A), 5 to 200 parts by weight of component (C), and an amount of component (D) to provide 0.1 to 100 ppm of platinum relative to the total weight of components (A), (B) and (C). To the mix, 10 to 50 parts by weight of component (F) may be added if desired for reducing the glass transition temperature.

The cured rubber is formed by any of prior art well-known techniques, for example, by casting the composition into a suitable mold and causing the composition to cure therein, by coating the composition onto a suitable substrate and curing it thereto, or by lamination. The curing is readily achieved by heating at a temperature of about 60 to about 150° C. for about 30 to about 180 minutes.

The cured rubber thus obtained is typically a rubber material having a hardness of 10 to 80 according to JIS K6253, a glass transition temperature of up to −60° C., and a gasoline saturation swell factor of up to 6% at 23° C.

The cured perfluoropolyether gel can be formed by combining 100 parts by weight of component (A) with 1 to 300 parts by weight of component (E), an amount of component (B) to provide 0.2 to 2.0 moles of hydrosilyl groups per mole of total alkenyl groups in components (A) and (E), and an amount of component (D) to provide 0.1 to 100 ppm of platinum relative to the total weight of components (A), (B) and (E). To the mix, 20 to 100 parts by weight of component (F) may be added if desired for reducing the glass transition temperature.

The cured gel is formed by any of prior art well-known techniques, for example, by casting the composition into a suitable mold and causing the composition to cure therein, by coating the composition onto a suitable substrate and curing it thereto, or by lamination. The curing is readily achieved by heating at a temperature of about 60 to about 150° C. for about 30 to about 180 minutes.

The cured gel thus obtained is typically a gel material having a penetration of 10 to 150 according to the consistency test (using a ¼ cone) of JIS K2220 or ASTM D-1403, a glass transition temperature of up to −60° C., and a gasoline saturation swell factor of up to 6% at 23° C.

Rubber or gel articles comprising the cured perfluoropolyether rubber or gel compositions of the invention are suitable for use in a variety of applications, for example, automobiles, chemical plants, ink jet printers, semiconductor manufacturing lines, analytical or scientific instruments, medical equipment, aircraft, and fuel cells.

Specifically, rubber or gel articles comprising the cured perfluoropolyether rubber or gel compositions of the invention are suitable for use as rubber parts for automobiles, rubber parts for chemical plants, rubber parts for ink jet printers, rubber parts for semiconductor manufacturing lines, rubber parts for analytical and scientific instruments, rubber parts for medical equipment, rubber parts for aircraft, tent coating materials, sealants, molded parts, extruded parts, coats, copier roll materials, electrical and electronic moisture-proof coatings, sensor potting materials, fuel cell sealing materials, and laminate rubber fabrics.

More specifically, rubber or gel articles comprising the cured compositions of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints;

rubber parts for aircraft, for example, O-rings, face seals, packings, gaskets, diaphragms, and valves in fluid piping for engine oil, jet fuel, hydraulic oil and Skydrol®;

rubber parts for fuel cells, for example, sealants between electrodes, O-rings, face seals, packings, gaskets, diaphragms, and valves in hydrogen, air and coolant water feed pipes;

electric and electronic moisture-proof coating materials and sensor potting materials for use in, for example, gas pressure sensors, hydraulic pressure sensors, temperature sensors, humidity sensors, rotation sensors, gravity sensors, timing sensors, air flow meters, electronic circuits, semiconductor modules, and various control units.

When the inventive compositions are potted or coated onto substrates to form cured products thereon, it is advantageous to use conventional primers in order to improve the bond or adhesion of the inventive compositions to substrates. The use of primers prevents penetration of chemicals and solvents from the substrate interface, and improves the acid resistance, chemical resistance and solvent resistance of entire parts.

Use may be made of commercially available primers including a silane primer based on a silane coupling agent, an organohydrogenpolysiloxane-based primer, a synthetic rubber-based primer, an acrylic resin-based primer, a urethane resin-based primer, and an epoxy resin-based primer.

The cured products of the inventive compositions preferably have a weight gain of up to 6% when saturated in gasoline at 23° C. If this weight gain is more than 6%, the cured products may fail to exert their own performance with a possibility that swelling cause malfunction of the associated electric or electronic part or allow leakage from the seal.

The cured products of the inventive compositions also preferably have a weight gain of up to 8% when immersed in conc. sulfuric acid (98%) at 23° C. If this weight gain is more than 8%, the cured products may allow leakage from the seal or premature occurrence of corrosion in protected substrates or electric or electronic parts.

EXAMPLE

Examples are given below by way of illustration and not by way of limitation. Note that all parts (pbw) and % are by weight.

Example 1

A composition was prepared by combining 100 pbw of a polymer having formula (10) (viscosity 5,600 cSt) with 1.5 pbw of fumed silica Aerosil R972 (Aerosil Co., Ltd.). There were further added 0.3 pbw of a 50% toluene solution of ethynyl cyclohexanol, 0.2 pbw of a toluene solution of chloroplatinic acid-vinylsiloxane complex (platinum metal concentration 0.5 wt %), and 3.3 pbw of a compound having

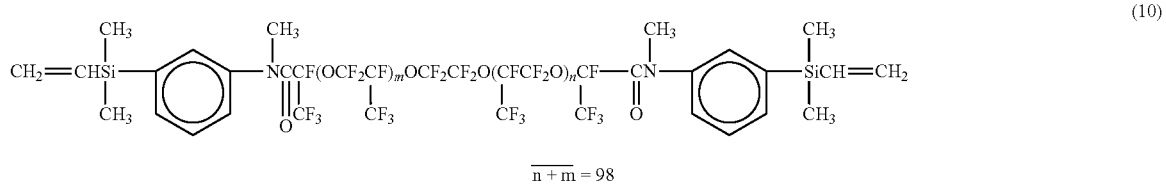

(10)

(11)

formula (11), followed by mixing.

The composition was press molded at 150° C. for 10 minutes and post-cured at 150° C. for 50 minutes, forming a cured product, designated Rubber A. Physical properties of the cured product were measured according to JIS K6249. The results are shown in Table 1.

Example 2

A composition was prepared by combining 100 pbw of a polymer having formula (12) (viscosity 7,500 cSt) with 4 pbw of Aerosil R976 (Aerosil Co., Ltd.). There were further added 0.3 pbw of a 50% toluene solution of ethynyl cyclohexanol, 0.2 pbw of a toluene solution of chloroplatinic acid-vinylsiloxane complex (platinum metal concentration 0.5 wt %), and 2.7 pbw of a compound having formula (13), followed by mixing.

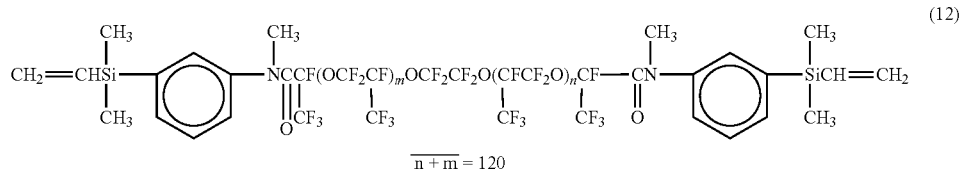

(12)

-continued

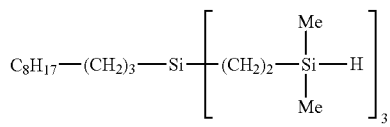

(13)

The composition was press molded at 150° C. for 10 minutes and post-cured at 150° C. for 50 minutes, forming a cured product, designated Rubber B. Physical properties of the cured product were measured according to JIS K6249. The results are shown in Table 1.

Comparative Example 1

A composition was prepared by combining 100 pbw of a polymer having formula (14) (viscosity 2,500 cSt) with 4 pbw of Aerosil R976 (Aerosil Co., Ltd.). There were further added 0.3 pbw of a 50% toluene solution of ethynyl cyclohexanol, 0.2 pbw of a toluene solution of chloroplatinic acid-vinylsiloxane complex (platinum metal concentration 0.5 wt %), and 9.0 pbw of the compound having formula (11) used in Example 1, followed by mixing.

and expressed in unit of ×$10^{-9}$ $cm^3$(STP)·cm/$cm^2$·sec·cmHg. The test for water vapor permeability was conducted at a temperature of 40° C. and a relative humidity of 90% according to JIS Z0208.

Gasoline Immersion Test on Rubber

A sample of the composition was weighed and cured in a glass container having a diameter of 30 mm and a height of 15 mm where it was immersed in gasoline at 23° C. A percent weight change was determined upon saturation swell at 23° C.

Acid Resistance Test (in Weight Change) on Rubber

A sample of the composition was poured in a test tube having a diameter of 8 mm and a length of 90 mm to a height of 30 mm from the bottom, cured therein, and immersed in an

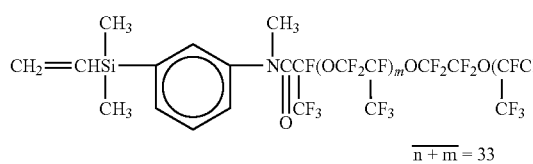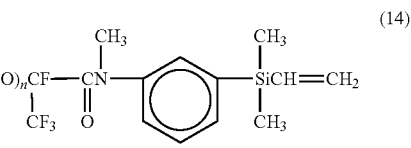

(14)

$\overline{n + m} = 33$

The composition was press molded at 150° C. for 10 minutes and post-cured at 150° C. for 50 minutes, forming a cured product, designated Rubber C. Physical properties of the cured product were measured according to JIS K6249. The results are shown in Table 1.

Gas and Water Vapor Permeability Tests on Rubber

The cured products of Examples 1 and 2 and Comparative Example 1 were measured for permeability of various gases ($CO_2$, $NO_2$ and $SO_2$) and water vapor. The test for gas permeability was conducted at a temperature of 30° C. using a gas permeability meter M-C3 by Toyo Seiki Mfg. Co., Ltd.

acidic solution having a predetermined concentration at 23° C. for 3 days. A percent weight change before and after the immersion was determined.

Acid Resistance Test (in Physical Change) on Rubber

A sample of the composition was poured in a test tube having a diameter of 8 mm and a length of 90 mm to a height of 30 mm from the bottom, cured therein, and immersed in conc. sulfuric acid at 23° C. for 3 days. Changes of rubber physical properties before and after the immersion were determined.

The results are shown in Table 1.

TABLE 1

| | | Rubber A | Rubber B | Rubber C | Rubber D | Rubber E |
|---|---|---|---|---|---|---|
| Initial physical properties | Hardness (Durometer A) | 20 | 25 | 35 | 50 | 70 |
| | Tensile strength (MPa) | 1.0 | 1.2 | 1.1 | 9.0 | 8.0 |
| | Elongation (%) | 290 | 230 | 150 | 350 | 200 |
| Physical properties after acid test | Hardness (Durometer A) | 18 | 23 | 29 | dissolved | dissolved |
| | Tensile strength (MPa) | 0.9 | 1.1 | 0.6 | dissolved | dissolved |
| | Elongation (%) | 300 | 240 | 180 | dissolved | dissolved |
| Gas permeability (×$10^{-9}$ $cm^3$·cm/ $cm^2$·sec·cmHg) | $CO_2$ | 39 | 42 | 46 | 290 | 58 |
| | $NO_2$ | 76 | 80 | 89 | 640 | 110 |
| | $SO_2$ | 138 | 160 | 196 | 1250 | 250 |

TABLE 1-continued

|  |  | Rubber A | Rubber B | Rubber C | Rubber D | Rubber E |
|---|---|---|---|---|---|---|
| Water vapor permeability (g/cm² · 24 hr) | | 3 | 5 | 9 | 100 | 50 |
| Gasoline swell factor (%) | | 3 | 2 | 8 | 260 | 12 |
| Acid resistance/ swell factor (%) | conc. HCl | 0.0 | 0.0 | 0.0 | 0.2 | 0.1 |
| | conc. HNO$_3$ | 0.1 | 0.1 | 0.1 | dissolved | 0.2 |
| | conc. H$_2$SO$_4$ | 3.8 | 4.5 | 7.9 | dissolved | dissolved |

Note that in the test following the acid immersion, physical properties of Rubber D and Rubber E could not be measured because they were dissolved in sulfuric acid.

Rubber D is a silicone rubber based on dimethylsilicone, available as KE951 from Shin-Etsu Chemical Co., Ltd.

Rubber E is a fluorosilicone rubber based on a copolymer of dimethylsilicone and trifluoropropyl group-containing silicone, available as FE271 from Shin-Etsu Chemical Co., Ltd.

Example 3

A composition was prepared by combining 65 pbw of a polymer having formula (12) and 10 pbw of a polymer having formula (15) (viscosity 650 cSt) with 25 pbw of a polymer having formula (16), 0.15 pbw of a 50% toluene solution of ethynyl cyclohexanol, 0.015 pbw of an ethanol solution of chloroplatinic acid-vinylsiloxane complex (platinum metal concentration 3.0 wt %), and 14.2 pbw of a compound having formula (17), followed by mixing.

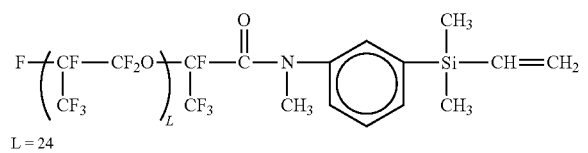
(15)

L = 24

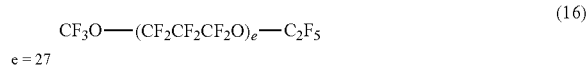
(16)

e = 27

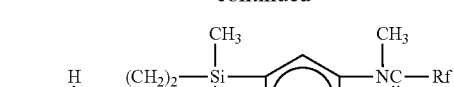
(17)

n = 24

The composition was heated at 150° C. for one hour, forming a gel product, designated Gel A. The penetration of this gel was measured according to ASTM D-1403 using a ¼ cone. The results are shown in Table 2.

Example 4

A composition was prepared by combining 45 pbw of the polymer having formula (10) and 22 pbw of a polymer having formula (18) (viscosity 1000 cSt) with 33 pbw of a polymer having formula (19), 0.15 pbw of a 50% toluene solution of ethynyl cyclohexanol, 0.015 pbw of an ethanol solution of chloroplatinic acid-vinylsiloxane complex (platinum metal concentration 3.0 wt %), and 8.5 pbw of a compound having formula (20), followed by mixing.

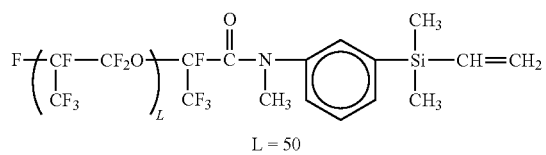
(18)

L = 50

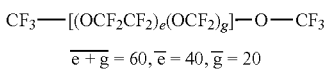
(19)

$\overline{e+g} = 60, \overline{e} = 40, \overline{g} = 20$

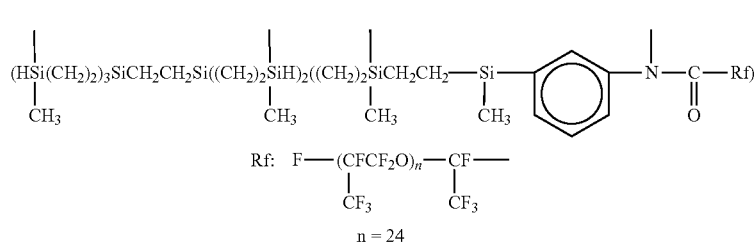
(20)

n = 24

The composition was heated at 150° C. for one hour, forming a gel product, designated Gel B. The penetration of this gel was measured according to ASTM D-1403 using a ¼ cone. The results are shown in Table 2.

Comparative Example 2

A composition was prepared by combining 35 pbw of the polymer having formula (14) and 40 pbw of the polymer having formula (15) (viscosity 1000 cSt) with 25 pbw of the polymer having formula (16), 0.15 pbw of a 50% toluene solution of ethynyl cyclohexanol, 0.015 pbw of an ethanol solution of chloroplatinic acid-vinylsiloxane complex (platinum metal concentration 3.0 wt %), and 13.5 pbw of a compound having formula (21), followed by mixing.

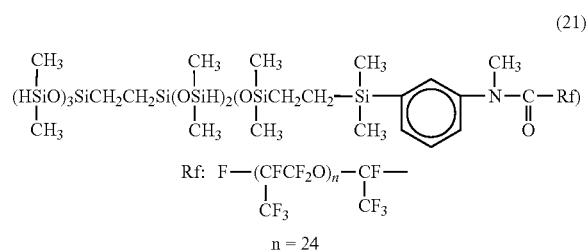

The composition was heated at 150° C. for one hour, forming a gel product, designated Gel C. The penetration of this gel was measured according to ASTM D-1403 using a ¼ cone. The results are shown in Table 2.

The composition was heated at 150° C. for one hour, forming a gel product, designated Gel D. The penetration of this gel was measured according to ASTM D-1403 using a ¼ cone. The results are shown in Table 2.

Gasoline Immersion Test on Gel

A sample of the composition was weighed and cured in a glass container having a diameter of 30 mm and a height of 15 mm where it was immersed in gasoline at 23° C. A percent weight change was determined upon saturation swell.

Acid Resistance Test (in Weight Change) on Gel

A sample of the composition was poured in a test tube having a diameter of 8 mm and a length of 90 mm to a height of 30 mm from the bottom, cured therein, and immersed in an acidic solution having a predetermined concentration at 23° C. for 3 days. A percent weight change before and after the immersion was determined.

Acid Resistance Test (in Physical Change) on Gel

A sample of the composition was poured in a test tube having a diameter of 8 mm and a length of 90 mm to a height of 30 mm from the bottom, cured therein, and immersed in conc. sulfuric acid at 23° C. for 3 days. A change of penetration before and after the immersion were determined.

Acid Resistance Test (in Appearance) on Gel

In the above acid resistance test, after the sample was immersed in conc. sulfuric acid at 23° C. for 3 days, the appearance of the sample was observed and rated "OK" for no change, "Fair" for a little change or slight turbid, "Poor" for substantial changes or white turbid, and "Reject" when it was dissolved.

The results are shown in Table 2.

TABLE 2

|  |  | Gel A | Gel B | Gel C | Gel D | Gel E | Gel F |
| --- | --- | --- | --- | --- | --- | --- | --- |
| Penetration | Initial | 40 | 72 | 45 | 68 | 65 | 65 |
|  | After conc. $H_2SO_4$ immersion | 38 | 69 | 58 | 60 | dissolved | Dissolved |
| Gasoline swell factor (%) |  | 2 | 2 | 6 | 3 | 10 | 300 |
| Acid resistance/ Swell factor (%) | conc. HCl | 0.0 | 0.0 | 0.0 | 0.0 | 0.2 | 0.1 |
|  | conc. $HNO_3$ | 0.1 | 0.1 | 0.1 | 0.1 | dissolved | 0.3 |
|  | conc. $H_2SO_4$ | 4.2 | 4.8 | 10.3 | 18.5 | dissolved | Dissolved |
| Appearance after conc. $H_2SO_4$ immersion |  | OK | OK | Poor | Fair | Reject | Reject |

Comparative Example 3

A composition was prepared by combining 40 pbw of the polymer having formula (10) and 35 pbw of the polymer having formula (15) (viscosity 1000 cSt) with 25 pbw of the polymer having formula (16), 0.15 pbw of a 50% toluene solution of ethynyl cyclohexanol, 0.015 pbw of an ethanol solution of chloroplatinic acid-vinylsiloxane complex (platinum metal concentration 3.0 wt %), and 8.1 pbw of a compound having formula (22), followed by mixing.

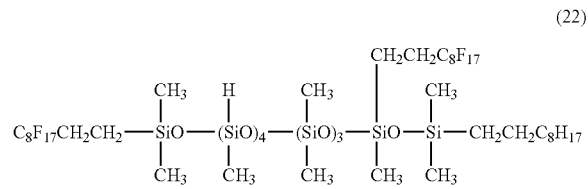

Note that in the penetration test following the acid immersion, physical properties of Gel E and Gel F could not be measured because they were dissolved in sulfuric acid.

Gel E is a fluorosilicone gel based on trifluoropropyl group-containing silicone, available as FE57 from Shin-Etsu Chemical Co., Ltd.

Gel F is a silicone gel based on dimethylsilicone, available as KE1052 from Shin-Etsu Chemical Co., Ltd.

Example 5

Acid Resistant Test (Manufacturing Plant)

Figure 2:
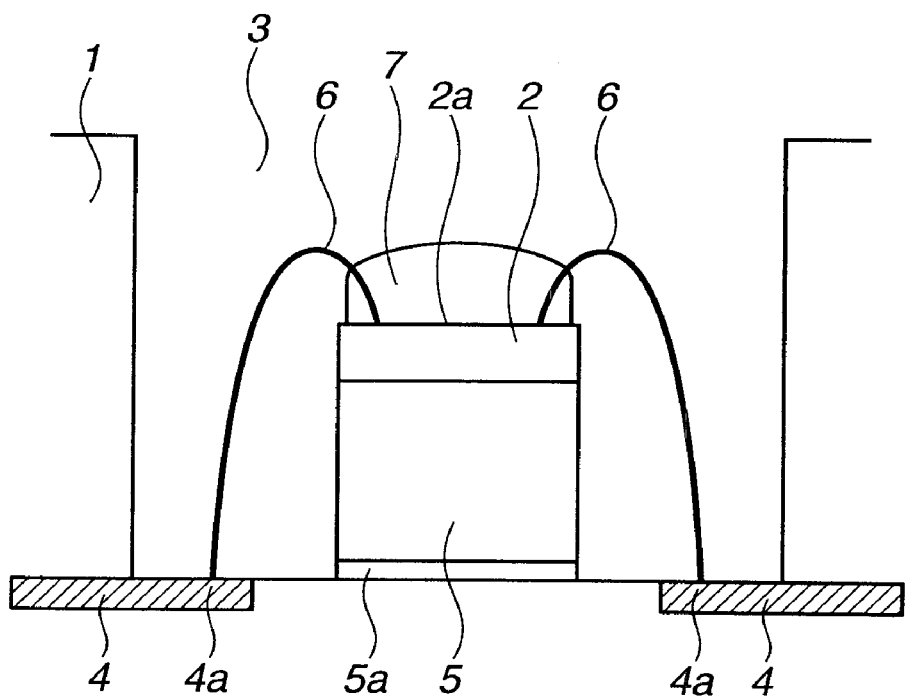

Using Gels A to D obtained in Examples 3 and 4 and Comparative Examples 2 and 3, electronic parts were encapsulated for protection as shown in FIGS. 1 and 2. Illustrated in FIGS. 1 and 2 are a housing 1, a comb-shaped electrode 2, a cavity 3, insert pins or leads 4, a pedestal 5, an adhesive 5a, bonding wires 6, and a protective material 7.

An acid resistance test was conducted on these packages. Specifically, the electronic parts protected with Gels A to D were immersed in aqueous solutions of sulfuric acid and nitric acid having a concentration of 50% at 60° C. for 500 hours in an open atmosphere. After 500 hours, the outer appearance of the parts was visually observed to inspect any corrosion. The results are shown in Table 3.

TABLE 3

| | | Gel A | Gel B | Gel C | Gel D |
|---|---|---|---|---|---|
| Corrosion state | Electrode | intact | intact | corroded | corroded |
| | Wire | intact | intact | corroded | corroded |
| | Lead | intact | intact | intact | corroded |

Japanese Patent Application No. 2004-174777 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of improving an acid resistance of a gel, said method comprising:
   preparing a curable perfluoropolymer composition comprising
   (A) a linear perfluoropolyether compound containing at least two alkenyl groups per molecule, having a perfluoropolyether structure comprising recurring units —$C_aF_{2a}O$— wherein a is an integer of 1 to 6 in its backbone, and having a weight average molecular weight of 10,000 to 100,000,
   (B-2) an organosilicon compound containing at least two silicon atom-bonded hydrogen atoms per molecule and at least one perfluoroalkyl group or perfluoropolyether substituent group per molecule wherein all silicon atom-bonded hydrogen atoms form H—$SiR^6{}_2(CH_2)_g$Si— structures wherein g is an integer of 1 to 3, and having general formula (6):

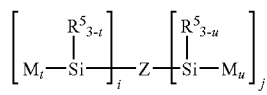

wherein i and j are 0 or 1, excluding the case where both i and j are 0, in the case where either one of i and j is 0 and the other is 1, Z is -Q-$Rf^3$, Q is a divalent hydrocarbon group of 1 to 15 carbon atoms which may contain an ether bond, $Rf^3$ is a monovalent perfluoroalkyl or perfluorooxyalkyl group, M is a group of formula (i):

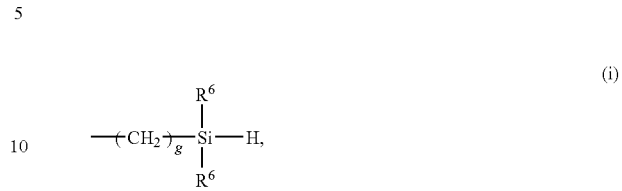

$R^6$ is a monovalent hydrocarbon group of 1 to 20 carbon atoms, and g is an integer of 1 to 3, in the case where both i and j are 1, Z is, —Rf— or -Q-Rf'-Q-, Q is as defined above, Rf' is a divalent perfluoroalkylene or perfluorooxyalkylene group, M is a group of the formula (ii) and/or a group of the formula (iii):

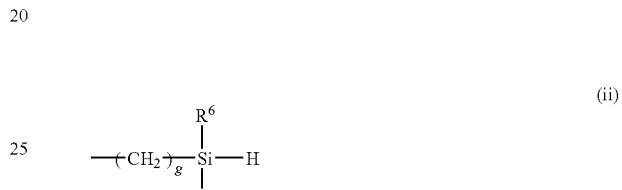

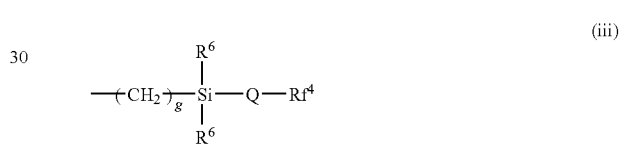

wherein $Rf^4$ is monovalent perfluoroalkyl or perfluoropolyether group and Q and g are as defined above, with the proviso that there are present at least two groups of formula (ii) per molecule, $R^5$ is a monovalent hydrocarbon group of 1 to 20 carbon atoms, t is 1, 2 or 3, and u is 0, 1, 2 or 3,
   (D) a hydrosilylation catalyst, and
   (E) a polyfluoromonoalkenyl compound containing one alkenyl group per molecule and having a perfluoropolyether structure in its backbone, and
   curing said curable perfluoropolyether composition,
   thereby forming a gel having a weight gain of up to 6% when saturated in gasoline at 23° C. and a weight gain of up to 8% when immersed in concentrated sulfuric acid (98%) at 23° C. for 3 days.

2. The method of claim 1, wherein in component (A), the perfluoropolyether structure comprising recurring units —$C_aF_{2a}$a— is represented by $(C_aF_{2a}O)_q$ wherein q is an integer of 50 to 600.

3. The method of claim 1, wherein component (A) is a linear perfluoropolyether compound having the general formula (1):

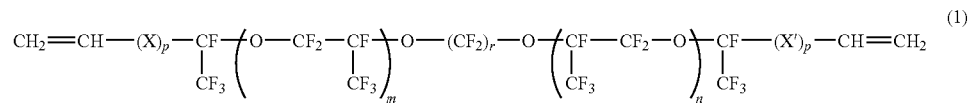

wherein

X is —$CH_2$—, —$CH_2O$—, —$CH_2OCH_2$— or —Y—$NR^1$—CO— wherein Y is —$CH_2$— or a dimethylphenylsilylene group of the structural formula (Z):

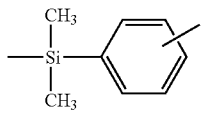
(Z)

(inclusive of o-, m- and p-positions), and $R^1$ is hydrogen, methyl, phenyl or allyl, X' is —$CH_2$—, —$OCH_2$—, —$CH_2OCH_2$— or —CO—$NR^2$—Y— wherein Y is —$CH_2$— or a dimethylphenylsilylene group of the structural formula (Z'):

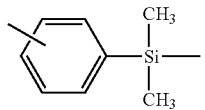
(Z')

(inclusive of o-, m- and p-positions), and $R^2$ is hydrogen, methyl, phenyl or allyl, p is independently 0 or 1, r is an integer of 2 to 6, and m and n each are an integer of 0 to 600, provided that the sum of m+n is 50 to 600.

4. The method of claim 1, wherein component (E) is a polyfluoromonoalkenyl compound having the general formula (2):

$$Rf^2—(X')_p—CH=CH_2 \quad (2)$$

wherein X' and p are as defined above, $Rf^2$ is a group of the general formula:

$$F—[CF(CF_3)CF_2O]_w—CF(CF_3)—$$

wherein w is an integer of 1 to 500.

5. The method of claim 1, wherein the gel is configured for use in automobiles, chemical plants, ink jet printers, semiconductor manufacturing lines, analytical or scientific instruments, medical equipment, aircraft or fuel cells.

6. The method of claim 1, further comprising (F) at least one linear polyfluoro compound selected from the group consisting of compounds having the general formula (3):

$$A-O—(CF_2CF_2CF_2O)_d-A \quad (3)$$

wherein A is a group of the formula $C_eF_{2e+}$— wherein e is an integer of 1 to 3, and d is an integer of 1 to 500, and compounds having the general formula (4):

$$A-O—(CF_2O)_f(CF_2CF_2O)_h-A \quad (4)$$

wherein A is as defined above, and f and h each are an integer of 1 to 300.

* * * * *